(12) United States Patent
Fukutani et al.

(10) Patent No.: US 7,470,118 B2
(45) Date of Patent: Dec. 30, 2008

(54) UNDERWATER CUTTING PELLETIZER

(75) Inventors: Kazuhisa Fukutani, Kobe (JP); Koichi Honke, Kobe (JP); Kazuo Iritani, Takasago (JP); Nobuki Nagami, Takasago (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 165 days.

(21) Appl. No.: 11/494,539

(22) Filed: Jul. 28, 2006

(65) Prior Publication Data

US 2007/0119286 A1    May 31, 2007

(30) Foreign Application Priority Data

Nov. 25, 2005  (JP)  ............... 2005-340996

(51) Int. Cl.
*B29B 9/10*  (2006.01)
(52) U.S. Cl. .................. 425/67; 425/313
(58) Field of Classification Search ............ 425/67, 425/68, 313, 311
See application file for complete search history.

(56) References Cited

U.S. PATENT DOCUMENTS

| | | | | |
|---|---|---|---|---|
| 3,452,394 A | * | 7/1969 | McNeal, Jr. | 425/311 |
| 3,599,285 A | * | 8/1971 | Hamilton | 425/313 |
| 4,097,212 A | * | 6/1978 | Morishima et al. | 425/313 |
| 4,300,877 A | * | 11/1981 | Andersen | 425/67 |
| 6,537,050 B1 | * | 3/2003 | Kasai et al. | 425/67 |
| 2005/0106277 A1 | * | 5/2005 | Fridley | 425/67 |

FOREIGN PATENT DOCUMENTS

| | | |
|---|---|---|
| DE | 198 36 618 A1 | 2/1999 |
| DE | 199 14 116 A1 | 9/2000 |
| DE | 602 09 791 T2 | 11/2006 |
| EP | 1 334 813 A1 | 8/2003 |
| EP | 1 455 997 B1 | 3/2006 |
| JP | 11-058372 | 3/1999 |
| JP | 2000-355015 | 12/2000 |
| JP | 2003-260706 | 3/2002 |

OTHER PUBLICATIONS

German Patent Office Official Letter dated Dec. 14, 2007, in German with English translation.

* cited by examiner

*Primary Examiner*—Robert B Davis
(74) *Attorney, Agent, or Firm*—Reed Smith LLP; Stanley P. Fisher, Esq.; Juan Carlos A. Marquez, Esq.

(57) ABSTRACT

An underwater cutting pelletizer is disclosed wherein a water chamber is circular in plan, an inlet portion is formed on one side in a diametrical direction of the water chamber to introduce cooling water into the water chamber, and an outlet portion is formed on the other side in the diametrical direction of the water chamber to discharge the cooling water from the interior of the water chamber to the exterior, the inlet portion being in a divergent shape in an inflow direction of cooling water. The retention time of pellets in the interior of the water chamber can be made as short as possible.

7 Claims, 15 Drawing Sheets

FIG. 4

CALCULATION CONDITIONS & PRESSURE LOSS

| CONDITIONS | REVOLUTIONS [rpm] | KNIFE PERIPHERAL VELOCITY* [m/s] | FLOW RATE [m³/h] | INLET FLOW VELOCITY** [m/s] | PRESSURE LOSS [Pa] |
|---|---|---|---|---|---|
| (a)-1 | 200 | 7.1 | 450 | 1.77 | 853 |
| (a)-3 | 200 | 7.1 | 700 | 2.75 | 2048 |
| (a)-2 | 750 | 26.7 | 450 | 1.77 | 1036 |
| (a)-4 | 750 | 26.7 | 700 | 2.75 | 2232 |

* CALCULATED FOR THE KNIFE OUTSIDE DIAMETER OF 0.68m.

** CALCULATED FOR INLET φ300. (=|L|)

VELOCITY VECTOR (PIPE CENTER SECTION)

FLOW TRACE LINES FROM THE INLET

RELATION BETWEEN GRANULE RELEASE
POSITIONS AND RETENTION TIME
(Case (a), AVERAGE 1.833 sec)

FIG. 8

SHAPE OF WATER CHAMBER

| Case | FEATURE |
|------|---------|
| (a) | PRESENT STATE |
| (b) | DIVERGENT INLET |
| (c) | DIVERGENT INLET + SLANT INLET + PARALLEL VELOCITY |
| (d) | DIVERGENT INLET + SLANT INLET + SLANT VELOCITY |
| (e) | MORE DIVERGENT INLET + MORE DIVERGENT OUTLET |
| (f) | DIVERGENT INLET + MORE DIVERGENT ASYMMETRIC OUTLET |
| (g) | DIVERGENT INLET + SLANT INLET + SLANT VELOCITY + MORE DIVERGENT ASYMMETRIC OUTLET |

FIG. 9

AVERAGE RETENTION TIME OF GRANULES

| Case | AVERAGE RETENTION TIME [s] Q=700m³/h d=2.4mm | AVERAGE RETENTION TIME [s] Q=700m³/h d=2.0mm | AVERAGE RETENTION TIME [s] Q=700m³/h d=2.8mm | AVERAGE RETENTION TIME [s] Q=450m³/h d=2.4mm |
|---|---|---|---|---|
| (a) | 1.833 | 1.841 | 1.772 | 2.694 |
| (a)' | 1.480 | - | - | 2.969 |
| (b) | 1.615 | - | - | - |
| (c) | 1.729 | - | - | - |
| (d) | 1.432 | 1.470 | 1.344 | 1.779 |
| (d)' | 1.225 | - | - | 1.713 |
| (e) | 1.649 | - | - | - |
| (f) | 1.540 | 1.589 | 1.499 | 1.976 |
| (f)' | 1.299 | - | - | 1.707 |
| (g) | 1.565 | - | - | - |
| (g)' | 1.314 | - | - | - |

( )': WITHOUT WINDOW

INFLUENCE OF THE PRESENCE OR ABSENCE OF WINDOW ON AVERAGE RETENTION TIME (FLOW RATE 700m³/h, GRANULE DIA. 2.4mm)

RELATION BETWEEN GRANULE RELEASE POSITIONS AND RETENTION TIME (Case (a)', AVERAGE 1.480 sec)

RELATION BETWEEN GRANULE RELEASE
POSITIONS AND RETENTION TIME
(Case (d)', AVERAGE 1.225 sec)

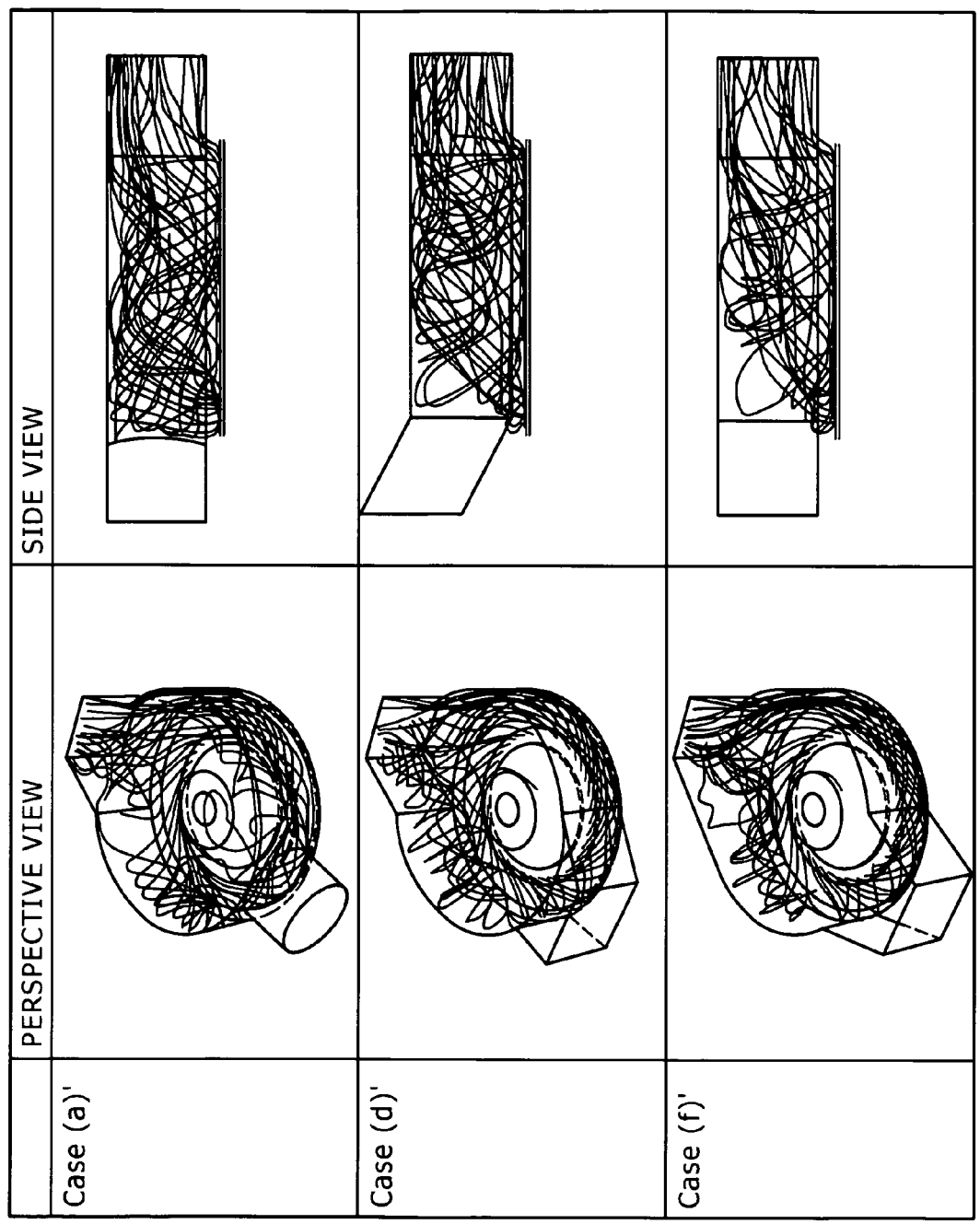
F I G. 15

COMPARISON OF AVERAGE RETENTION TIMES OF GRANULES
(FLOW RATE 700m³/h)

COMPARISON OF AVERAGE RETENTION TIMES
(GRANULE DIS. 2.4mm)

UNDERWATER CUTTING PELLETIZER

BACKGROUND OF THE INVENTION

1. Field of the Invention

The present invention relates to an underwater cutting pelletizer for use in producing resin pellets.

2. Description of the Related Art

As known well, an underwater cutting pelletizer for use in producing resin pellets is disposed on a downstream side of an extruder and is provided with a die plate, the die plate having nozzles through which molten resin (molten material to be processed) is extruded, and a cutter for cutting the resin extruded from the nozzles into pellets while rotating. In addition, there is provided a circulation box which covers the die plate and the cutter. The interior of the circulation box serves as a water chamber filled with circulating cooling water.

The water chamber is provided with an inlet portion for introducing cooling water into the interior of the water chamber. Cooling water supplied into the water chamber through the inlet portion not only cools the die plate and the cutter but also cools the pellets to a predetermined temperature and then flows out to the exterior from an outlet portion of the water chamber. At the same time, the cut pellets are also discharged to the exterior of the water chamber.

In such a water chamber it is very important for the cooling water to flow in accordance with a predetermined way of flowing. For example, it is necessary that the cooling water flow near the die plate and the cutter positively without stagnation. By so doing, not only the cutter and the die plate but also the cut pellets can be cooled to a predetermined temperature.

However, if the flow of the cooling water is not smooth and the cooling water stagnated within the water chamber, the cut pellets may stay for a long time within the water chamber or conversely may be discharged in a too short time from the water chamber. Thus, there is a possibility that the pellets cooling time may not coincide with a predetermined cooling time, with consequent deterioration in quality of the pellets. When the pellets stay for a long time within the water chamber, it is likely that the remaining pellets may strike against the cutter or the inner wall of the water chamber, or may stock each other, exerting a bad influence on the resin cutting work.

A technique for avoiding such an inconvenience is disclosed in Japanese Patent Laid-Open No. 2003-260706.

According to the technique disclosed in Japanese Patent Laid-Open No. 2003-260706, in order to make the temperature of cooling water which contacts a die plate uniform and thereby make the shape and size of the resulting pellets uniform, (i) at least three inlet portions are provided for introducing cooling water into a water chamber and (ii) an outlet portion for discharging the cooling water to the exterior is provided at a position deviated from extension lines of all the inlet portions.

The present inventors have performed a simulation of the flow of cooling water chamber in accordance with the technique disclosed in Japanese Patent Laid-Open No. 2003-260706. This simulation revealed the following points. The flow of cooling water is apt to stagnate in the vicinity of joined portions between the inlet portions and the water chamber and a joined portion between the outlet portion and the water chamber and pellets staying in the stagnation are not discharged to the exterior of the water chamber, further, complicated flows are formed within the water chamber by the flows of cooling water from the plural inlet portions and agitation of the cooling water caused by rotation of the cutter in the water chamber, resulting in occurrence of variations in the intra-water chamber retention time of cut pellets.

These phenomena give rise to a difference in pellets cooling time, with a great possibility of occurrence of variations in the quality, shape and size of pellets.

Moreover, since plural inlet portions are provided, a layout design and fabrication of cooling water supply pipes become complicated and as the case may be the flow of cooling water within the water chamber depends on the positional relation of plural inlet portions and outlet portion and the flow rate of cooling water. A lot of trials are needed for determining optimum values of such positional relation and flow rate.

SUMMARY OF THE INVENTION

The present invention has been accomplished in view of the above-mentioned problems and it is an object of the invention to provide an underwater cutting pelletizer having a water chamber which permits pellets introduced therein to be discharged promptly to the exterior of the water chamber and which can attain a uniform retention time of the pellets therein.

For achieving the above-mentioned object the present invention has adopted the following technical means.

In one aspect of the present invention there is provided a underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior, the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior, the inlet portion being in a divergent shape in an inflow direction of the cooling water.

Preferably, the ratio B/A between a sectional area, A, on a cooling water inflow side and a sectional area, B, on a cooling water outflow side, in the inlet portion, is in the range of 1.5 to 3.0.

In another aspect of the present invention there is provided an underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior, the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior, the inlet portion being formed in the water chamber inclinedly so that the cooling water flowing through the inlet portion faces the die plate side in the interior of the water chamber.

Preferably, the angle $\alpha$ of inclination of the inlet portion is in the range of 5° to 45°.

In a still further aspect of the present invention there is provided an underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior, the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior, the outlet portion being in a divergent shape in a direction opposite to an outflow direction of the cooling water and being asymmetric with respect to the diametrical direction of the water chamber.

Preferably, the ratio C/D between a sectional area, C, on a cooling water inflow side and a sectional area, D, on a cooling water outflow side, in the outlet portion, is in the range of 1.5 to 3.0.

More preferably, there is provided an underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior, the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior, the inlet portion being in a divergent shape in an inflow direction of the cooling water and being formed in the water chamber inclinedly so that the cooling water flowing through the inlet portion faces the die plate side in the interior of the water chamber, the outlet portion being in a divergent shape in a direction opposite to an outflow direction of the cooling water and being asymmetric with respect to the diametrical direction of the water chamber.

According to the present invention the retention time of cut pellets in the interior of the water chamber can be made substantially uniform and variations in temperature of the pellets can be kept to a minimum. Besides, the retention time of the pellets can be made as short as possible and the contact of the pellets with the inner wall of the water chamber and the cutter can be prevented.

BRIEF DESCRIPTION OF THE DRAWINGS

FIG. 4 illustrates conditions for simulation;

FIG. 8 illustrates conditions on the shape of water chambers (Case (a) to Case (f));

FIG. 9 illustrates the results of simulation performed under the conditions shown in FIG. 8;

FIG. 15 is a flowing trace diagram of simulative granules (water chambers of Case (a)', (d)', (f)');

DESCRIPTION OF THE PREFERRED EMBODIMENTS

An underwater cutting pelletizer according to the present invention will be described hereinunder with reference to the accompanying drawings.

Figure 1:
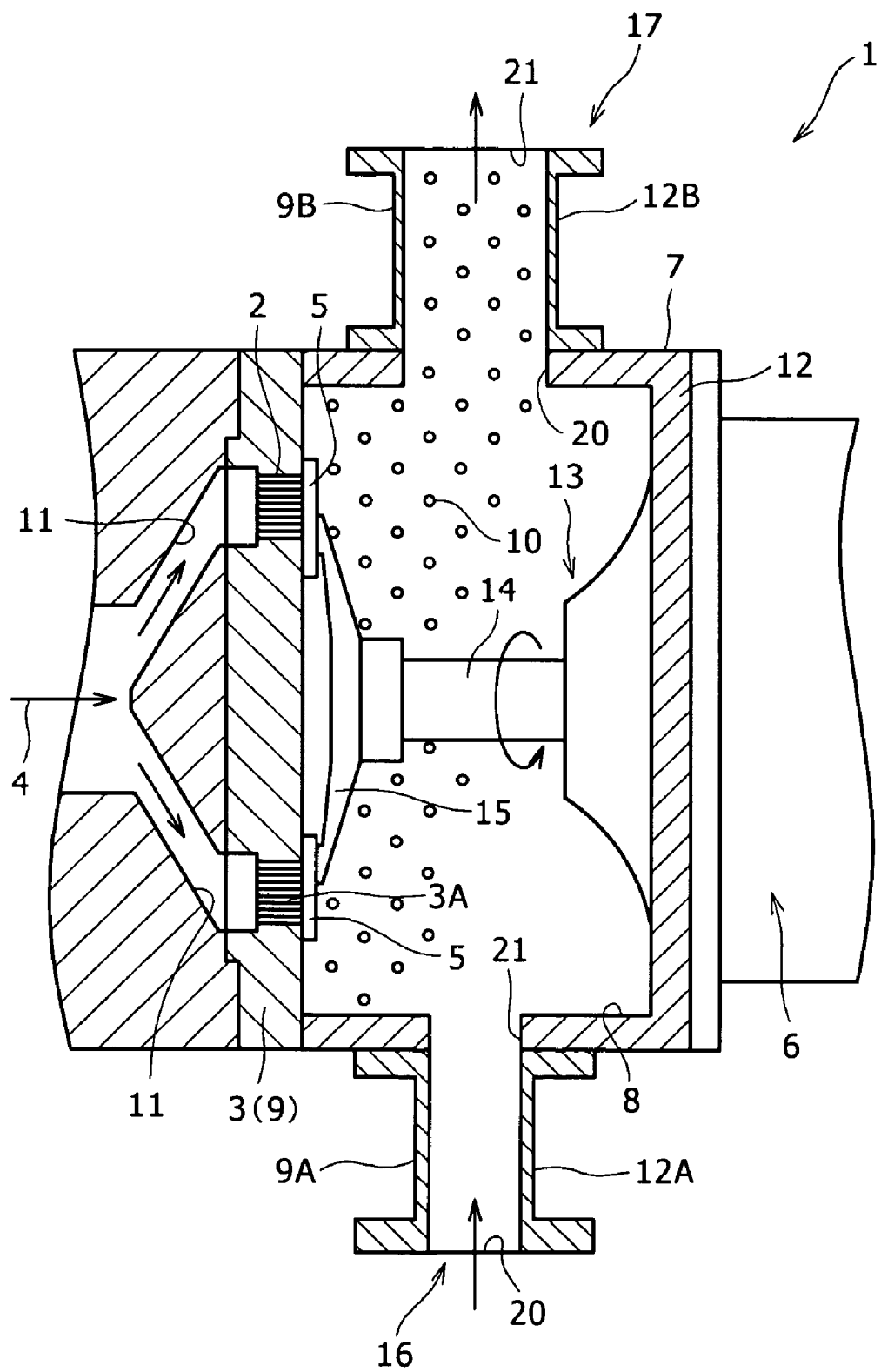
FIG. 1 is a sectional side view of an underwater cutting pelletizer according to the present invention.

FIG. 1 is a sectional side view of the underwater cutting pelletizer indicated at 1.

The underwater cutting pelletizer 1 includes a die plate 3 having a large number of nozzles 2 (die holes) and a cutter 5 adapted to move along a cutting surface 3A on the die plate 3 to cut off molten resin 4 (molten material to be processed) which is extruded from the nozzles 2. The underwater cutting pelletizer 1 further includes drive means 6 for rotating the cutter 5 on the die plate 3.

The die plate 3 and the cutter 5 are installed in the interior of a circulation box 7. The interior of the circulation box 7 forms a water chamber 8 which surrounds the die plate 3 and the cutter 5. A lower wall 9 (the left side wall in FIG. 1) of the water chamber 8 is constituted by the die plate 3. A twin-screw extruder or a gear pump or the like is connected to the die plate 3 on the side opposite to the water chamber, i.e., to the outside of the water chamber. The molten resin 4 supplied from the twin-screw extruder passes through resin introducing holes 11 formed in the die plate 3, then reaches the nozzles 2 and is extruded into the water chamber 8.

On the other hand, the drive means 6 is provided on an upper wall 12 side (the right side wall in FIG. 1) of the water chamber 8. More specifically, a bearing portion 13 is disposed on the upper wall 12 and a rotating shaft 14 is inserted rotatably through the bearing portion 13. A base end portion of the rotating shaft 14 is connected to a drive section (not shown) such as an electric motor. A front end portion of the rotating shaft 14 projects into the water chamber 8 and a central part of a disc-like cutter holder 15 is fixed to the foremost end of the rotating shaft 14. The cutters 5 (also called knives or blades) are mounted radially to the peripheral edge of the cutter holder 15. A rotational axis of the cutter holder 15 and that of the rotating shaft 14 are coaxial with each other, so that, when the rotating shaft 14 is rotated, the cutter 5 rotates about the axis of the rotating shaft 14.

As shown in FIG. 2, the water chamber 8 is generally circular when seen from the front side. An inlet portion 16 of a rectangular section is formed in a lower portion (the lower side in FIG. 2) of the water chamber 8 to introduce cooling water into the water chamber 8. In an upper portion (the upper side in FIG. 2) of the water chamber 8 there is formed an outlet portion 17 of a rectangular section to discharge cooling water from the interior of the water chamber 8 to the exterior together with cut pellets 10.

Windows 18 which permit observation of the interior of the water chamber 8 are formed on the right and left sides of the water chamber 8 which is generally circular when seen from the front side. The windows 18 are each in the form of a recess when seen from the inside of the water chamber 8. The windows 18 may be omitted.

Figures 2A, 2B:
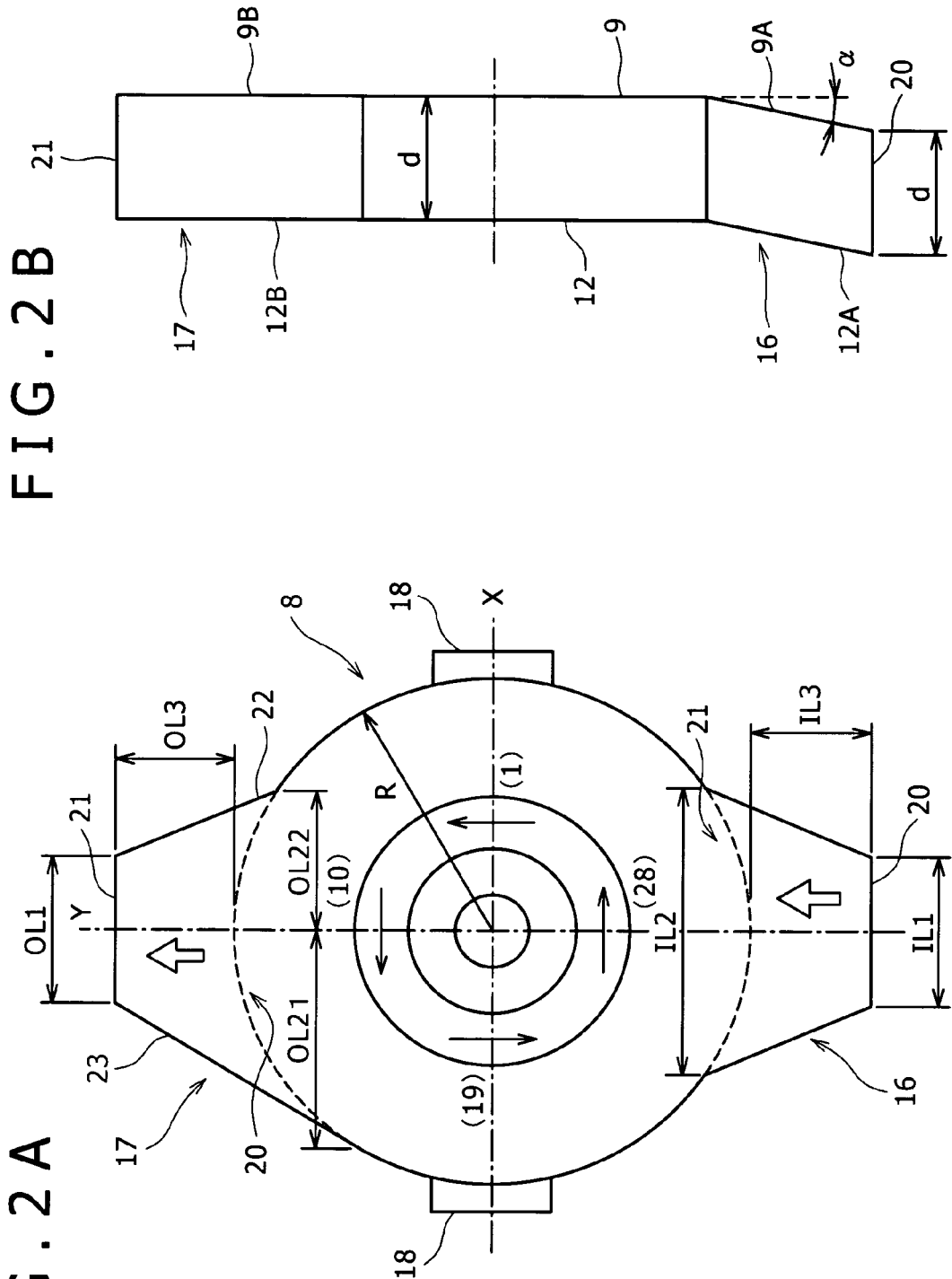
FIG. 2 illustrates the shape of a water chamber according to the present invention, in which (a) is a front view and (b) is a right side view.

As shown in FIG. 2(a), the inlet portion 16 in this embodiment is in the form of a horn which is divergent in the cooling water inflow direction to the water chamber 8. The ratio B/A between a sectional area, A, of a cooling water inflow side 20 of the inlet portion 16 and a sectional area, B, of a cooling water outflow side 21 is in the range of 1.5 to 3.0.

Particularly, the shape of the inlet portion 16 satisfies the following relationship:

$$B/A = (IL2 \cdot d)/(IL1 \cdot d) = 1.5 \int 3.0 \qquad (1)$$

In the above equation, IL1 represents the width on the cooling water inflow side of the inlet portion 16, IL2 represents the width on the cooling water outflow side of the inlet portion 16 (the width on the water chamber 8 side of the inlet portion 16), and IL3 represents the distance between the cooling water inflow side 20 and the cooling water outflow side 21, more exactly the distance between the cooling water inflow side 20 and an extension line of the inner wall of the water chamber 8.

In this embodiment the distance between the upper wall 12 and the lower wall 9 of the water chamber 8 is d and the distance between an upper wall 12A and a lower wall 9A of the inlet portion 16 is also d. Therefore, by satisfying the equation (1) is meant that the ratio between the width IL1 on the cooling water inflow side 20 of the inlet portion 16 and the width IL2 on the cooling water outflow side 21 of the inlet portion 16 is in the range of 1.5 to 3.0.

As is seen from the side view of FIG. 2(b), an extension line of the die plate 3 and a center line of the inlet portion 16 are inclined at an angle of α relative to each other so that the water flow in the inlet portion 16 strikes against the die plate 3.

$$\alpha = 5° \sim 45° \qquad (2)$$

If the inlet portion 16 satisfies the inclination α, not only the pellets 10 released into the water chamber 8 are discharged promptly to the exterior of the water chamber 8, but also the retention time of the pellets 10 in the interior of the water chamber 8 becomes uniform. More preferably, the inclination α is in the range of 5° to 30°.

In this embodiment, since the inlet portion 16 is a parallelogram in side view, the upper wall 12A and the lower wall 9A of the inlet portion 16 are substantially parallel to each other and an extension line of the die plate 3 and the lower wall 9 (or the upper wall 12) of the inlet portion 16 are inclined at an angle of α relative to each other.

On the other hand, as shown in FIG. 2(a), the outlet portion 17 is in a horn shape almost equal to the shape of the inlet portion 16, which is divergent in the direction opposite to the cooling water outflow direction from the water chamber 8 (in the following description this shape may be called an inverted divergent shape or a tapered shape). The ratio C/D of a sectional area C on the cooling water inflow side 20 of the outlet portion 17 to a sectional area D on the cooling water outflow side 21 of the outlet portion is in the range of 1.5 to 3.0.

In addition, the shape of the outlet portion 17 in plan is asymmetric with respect to the diametrical direction of the water chamber 8. Particularly, the following relationship is satisfied:

$$C/D = (OL2 \cdot d)/(OL1 \cdot d) = 1.5 \sim 3.0 \qquad (3)$$

$$OL22/OL21 = 0.535/0.869 = \text{approximately } 2/3 \qquad (4)$$

In the above equations, OL1 represents the width on the cooling water outflow side 21 of the outlet portion 17, OL2 represents the width on the cooling water inflow side 20 of the outlet portion 17, and OL3 represents the distance between the cooling water inflow side 20 and the cooling water outflow side 21, more exactly the distance between the cooling water outflow side 21 and an extension line of the inner wall of the water chamber 8.

In this embodiment the distance between an upper wall 12B and a lower wall 9B of the outlet portion 17 is also d. Therefore, by satisfying the equation (3) is meant that the ratio between the width OL1 on the cooling water inflow side 20 of the outlet portion 17 and the width OL2 on the cooling water outflow side 21 of the outlet portion 17 is in the range of 1.5 to 3.0.

The shape of the inlet portion 16 and that of the outlet portion 17 are determined on the basis of "simulation of the flow of cooling water in the water chamber 8" to be described later. That is, in the water chamber 8 which satisfies the shape to be described below, the pellets 10 released into the water chamber 8 are rapidly discharged to the exterior of the water chamber 8 and the retention time of the pellets 10 in the interior of the water chamber becomes uniform. Conversely, in the case of a water chamber not satisfying the shape to be described below, there arises a problem in point of discharge of the pellets. The present inventors have confirmed this point through a fluid simulation.

The followings are the sizes of various portions of the water chamber according to the present invention shown in FIG. 2:

IL1=0.625

IL2=0.458

IL3=1.073

OL1=0.625

OL21=0.869

OL22=0.535

OL2=OL21+OL22 d=0.750

R=1.000 (5)

The above sizes are normalized (made dimensionless) by the radius R of the water chamber 8. The asymmetric shape of the outlet portion 17 may be defined in accordance with the angle between the cooling water outflow side 21 and left and right side walls 23, 22 of the outlet portion 17 or by the length of the right side wall 22 and that of the left side wall 23.

The following description is now provided about a method of producing the pellets 10 by the underwater cutting pelletizer 1 and with use of the molten resin 4 supplied from the twin-screw extruder.

The molten resin 4 having been increased its pressure by the twin-screw extruder or a gear pump reaches the nozzles 2 through the resin introducing holes 11 formed in the die plate 3 and is then extruded like strings into the water chamber 8. At the same time, the resin strings are cut into a predetermined length by the cutters 5 which are rotating along the cutting surface 3A of the die plate 3 to form pellets 10. Within the water chamber 8 is formed a flow of cooling water from the inlet portion 16 formed in the lower portion of the water chamber 8 toward the outlet portion 17 formed in the upper portion of the water chamber 8. In accordance with the water flow the pellets 10 are carried to the exterior of the water chamber 8 and are dried into products.

Particularly in this embodiment the shape of the inlet portion 16 and that of the outlet portion 17 of the water chamber 8 are set so as to satisfy the equations (1) to (6), the retention time of the cut pellets 10 in the interior of the water chamber 8 becomes uniform. Consequently, variations in temperature of the pellets 10 can be kept to a minimum. Additionally, the retention time of the pellets 10 becomes short and it is possible to prevent contact of the pellets with the inner wall of the water chamber 8 and the cutters 5.

To determine the shape of the inlet portion 16 and that of the outlet portion 17 of the water chamber 8 described above, the present inventors have conducted "simulation of the flow of cooling water in the water chamber 8." The details of the simulation will be described below. As the case may be, simulation of the flow of cooling water in the water chamber 8 may be simply called fluid simulation or merely simulation.

[Fluid Simulation in the Conventional Water Chamber]

The present inventors have conducted a preliminary experiment involving analysis of the flow of cooling water in the interior of the water chamber 8 of the conventional underwater cutting pelletizer 1 and a study about how the pellet dischargeability is improved by changing the shape of the water chamber 8.

First, the present inventors have analyzed the flow of cooling water in the interior of the conventional water chamber 8 to check problems involved therein. Subsequently, traces of simulative granules of the pellets 10 and retention time thereof in the interior of the water chamber 8 were calculated to check the state of retention of the pellets 10.

Figure 3:
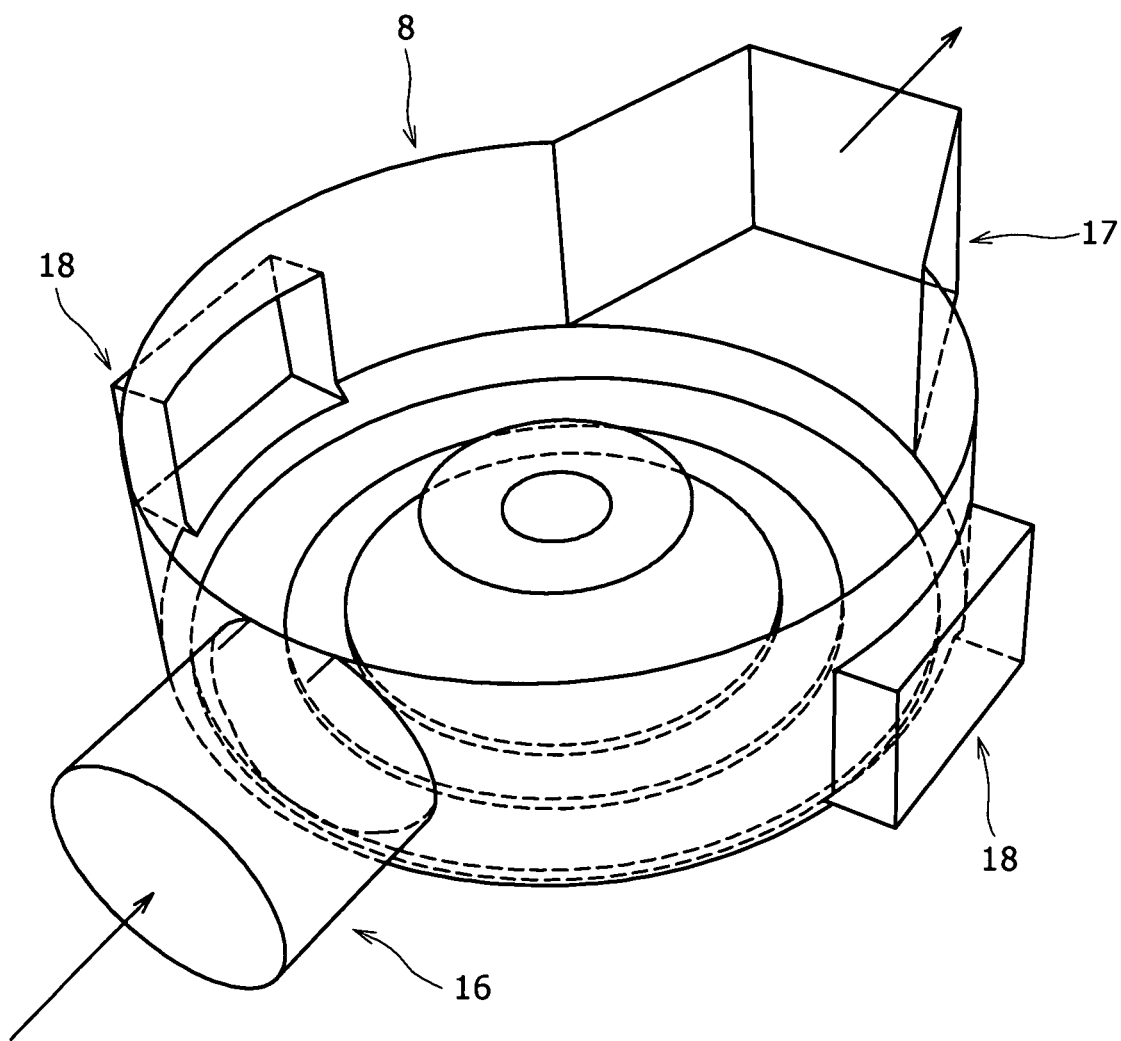
FIG. 3 illustrates the shape of a conventional water chamber used in simulation.

FIG. 3 illustrates morphological data of the conventional (existing) water chamber 8 used in the simulation in terms of a wire frame, which water chamber will be designated the water chamber 8 of Case (a).

Various portions of the water chamber 8 of Case (a) correspond to those shown in FIG. 2 and their sizes are as follows:

$IL1=IL2=0.625$ $IL3=0.500$ $OL1=0.625$ $OL21=0.535$ $OL22=0.535$ $OL2=OL21+OL22$ $OL3=0.458$ $d=0.750$ $R=1.000$     (6)

The above sizes are normalized (made dimensionless) by the radius R of the water chamber 8.

Since this simulation aims at grasping the flow of cooling water in the interior of the water chamber 8, attention is not paid to detailed flows around the rotating cutter holder 15 and the cutters 5 attached thereto. Therefore, the cutters 5 and the cutter holder 15 were simulated by a rotating disc to decrease a calculation load imposed on the simulation.

The number of revolutions of the cutter holder 15 and the flow rate of cooling water were set as in FIG. 4 in consideration of operations conditions of an actual machine and physical property values of tap water at 330K were used as physical property values of the cooling water.

As the program used in this simulation there was used a general-purpose fluid analysis code Fluent Ver. 6. The Fluent is a numerical hydrodynamics model which carries thereon a solver corresponding to a non-structural lattice based on a finite volume method and which can also perform a parallel processing calculation. It is used in various researches and developments.

Figure 5:
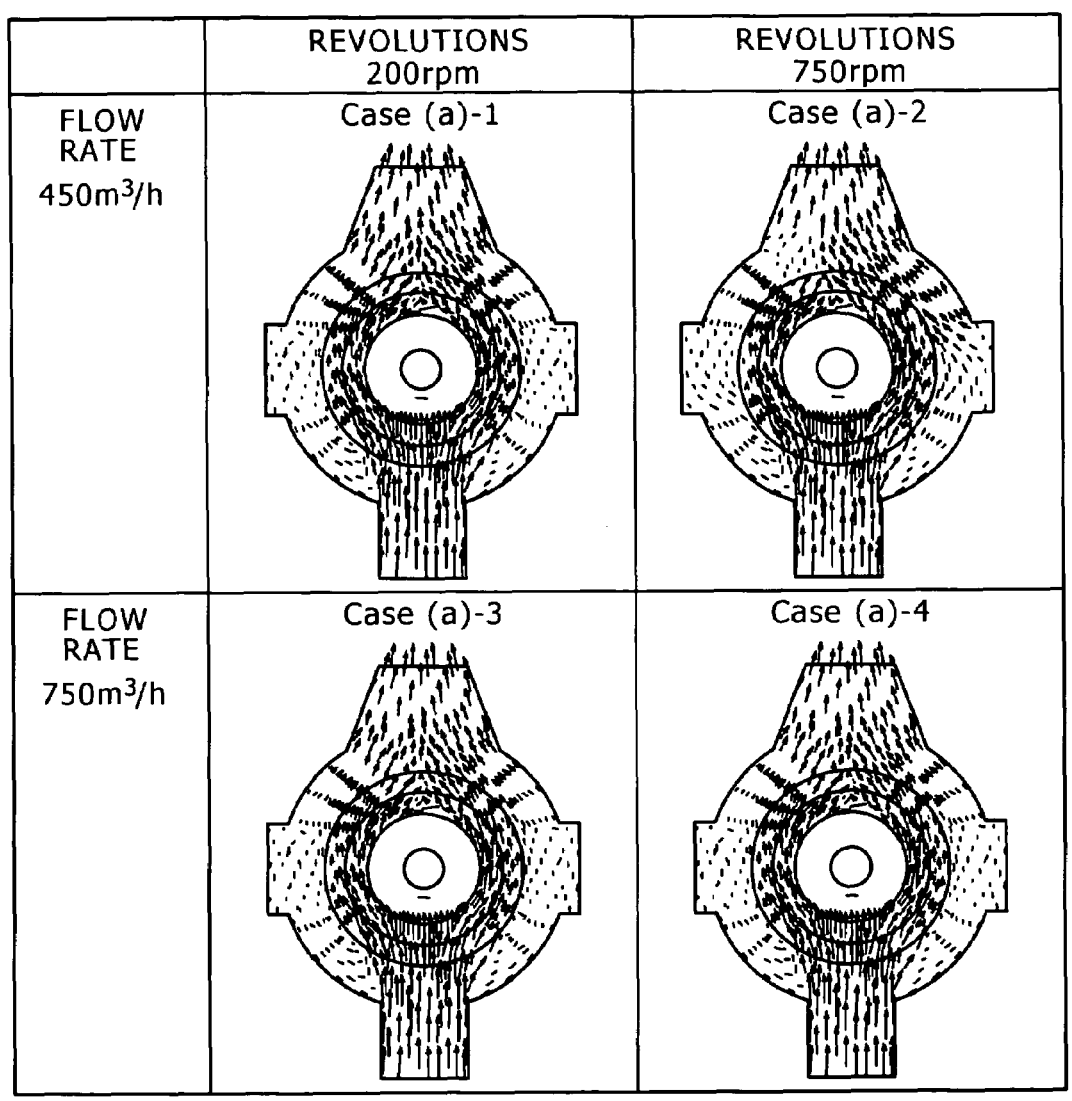
FIG. 5 illustrates a flow velocity distribution in the interior of the water chamber obtained by simulation (plan view, the conventional water chamber)
Figure 6:
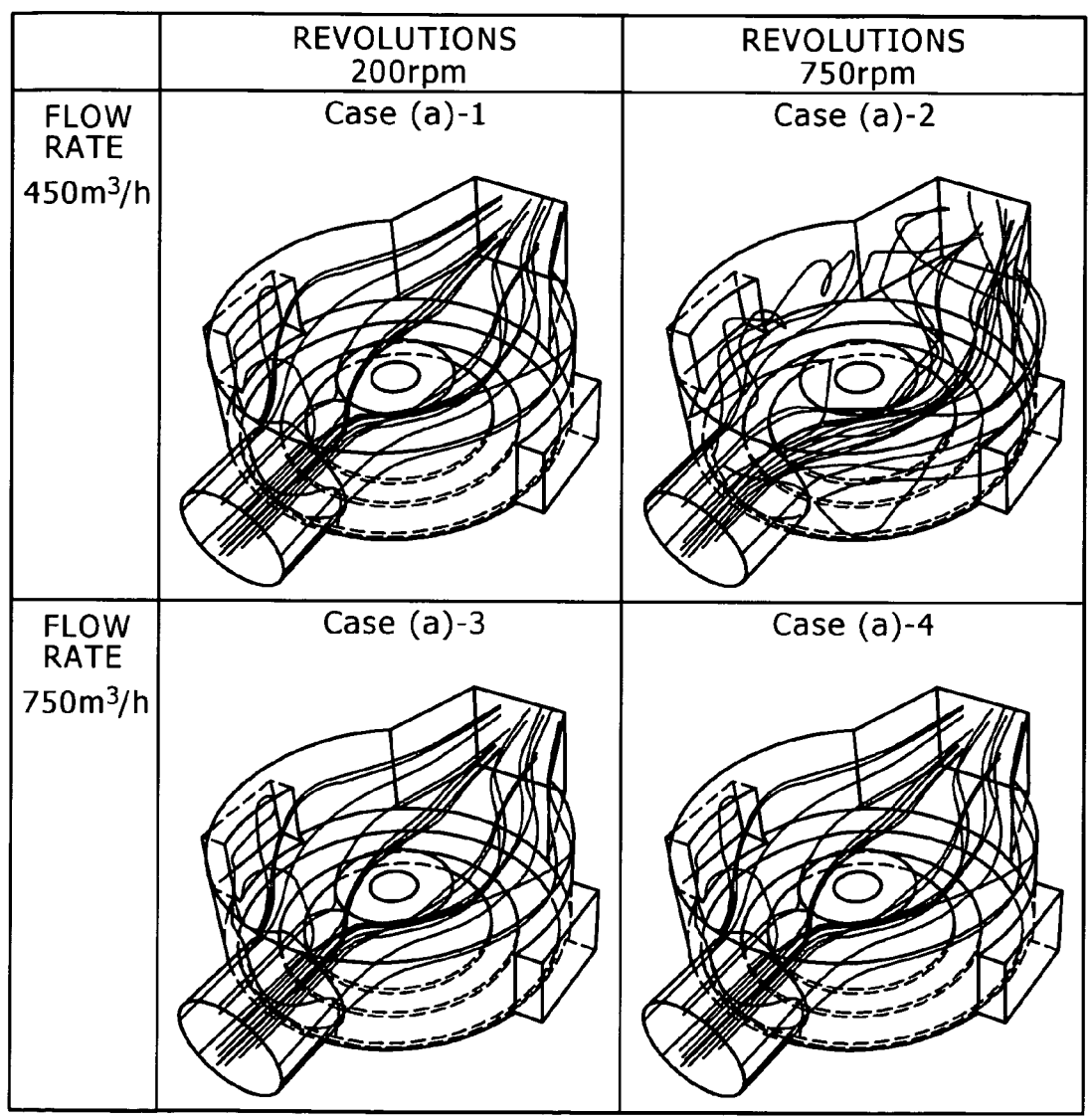
FIG. 6 illustrates streamlines in the interior of the water chamber obtained by simulation (perspective view, the conventional water chamber)

FIGS. 5 and 6 illustrate simulation results on the flow of cooling water in the water chamber 8 (FIG. 3) of Case (a).

FIG. 5 illustrates velocity vectors in the interior of the water chamber 8. The flow velocity in the interior of the water chamber 8 is relatively high in the portion from the inlet portion 16 to the center (near the rotating shaft 14) of the water chamber 8 and somewhat high in the vicinity of the outlet portion 17. However, it is seen that the flow velocity in question is very low sideways of the water chamber 8 (near the windows 18).

In FIG. 6 there are shown streamlines of cooling water flowing through the water chamber 8. As is apparent from this figure, the cooling water incoming from the inlet portion 16 and passing through the center of the water chamber 8 flows smoothly toward the outlet portion 17. However, the cooling water incoming from the inlet portion 16 and passing sideways of the water chamber 8 describes, in the vicinity of the inner wall of the water chamber 8, particularly in the vicinity of the windows 18, a meandering circle without advancing toward the outlet portion 17. Thus it is presumed that the flow is apt to stagnate sideways of the water chamber 8.

It is apparent from FIGS. 5 and 6 that the above tendency is almost equal even to the case where the shape of the water chamber 8 is changed like Case (a)-1 to Case (a)-4 and the number of revolutions of the cutters 5 and the flow rate of cooling water are changed. This means that the feature "stagnation does not occur sideways of the water chamber 8" is independent of the shape of the water chamber 8, the number of revolutions of the cutter holder 15 and the flow rate of cooling water. However, as the number of revolutions of the cutter holder 15 increases, the asymmetricity (right-left asymmetricity in FIG. 5) of the flow with respect to the rotating shaft 14 becomes more marked.

FIG. 7 shows the results of simulation of pellet traces and retention time in the case where the pellets 10 are mixed in the flow calculated previously.

In this simulation there are adopted simulative granules as the pellets 10 and the following calculation conditions.

Diameter of simulative granules: 2.0, 2.4, 2.8 mm

Density of simulative granules: 900 kg/m$^3$

Granule release surface: Contact surface 3A between the die plate 3 and the cutters 5

Number of granules released: 36 (every 10°)×3 rows=108 pieces

Initial velocity of granules: 0.1 m/s (perpendicular to the granule release surface 3A)

It was assumed that drag and buoyancy of cooling water acted on the simulative granules. The drag acting on the simulative granules can be determined by obtaining a drag coefficient $C_d$ with use of a calculation formula disclosed in the following Scientific Literature 1 or 2.

For example, according to the calculation formula disclosed in Scientific Literature 1, the drag coefficient can be determined as $C_d=22.73/R_e+0.0903/R_e^{2+3.69}$ in case of Reynolds number $R_e$ being in the range of 0.1 to 1.0.

Scientific Literature 1: An investigation of particle trajectories in two-phase flow systems, S. A. Morsi & A. J. Alexander, J. Fluid Mech. (1972), vol 55, part 2, pp 193-208.

Scientific Literature 2: Drag Coefficient and Terminal Velocity of Spherical and Nonspherical Particles, A. Haider & O. Levenspiel, Powder Technology, 58 (1989), pp 63-70.

Buoyancy of the pellets 10 was determined from the density thereof. In addition, the number of revolutions of the cutters 5 was set at 750 rpm and the flow rate of cooling water was set at 700 m³/h.

Figure 7B:
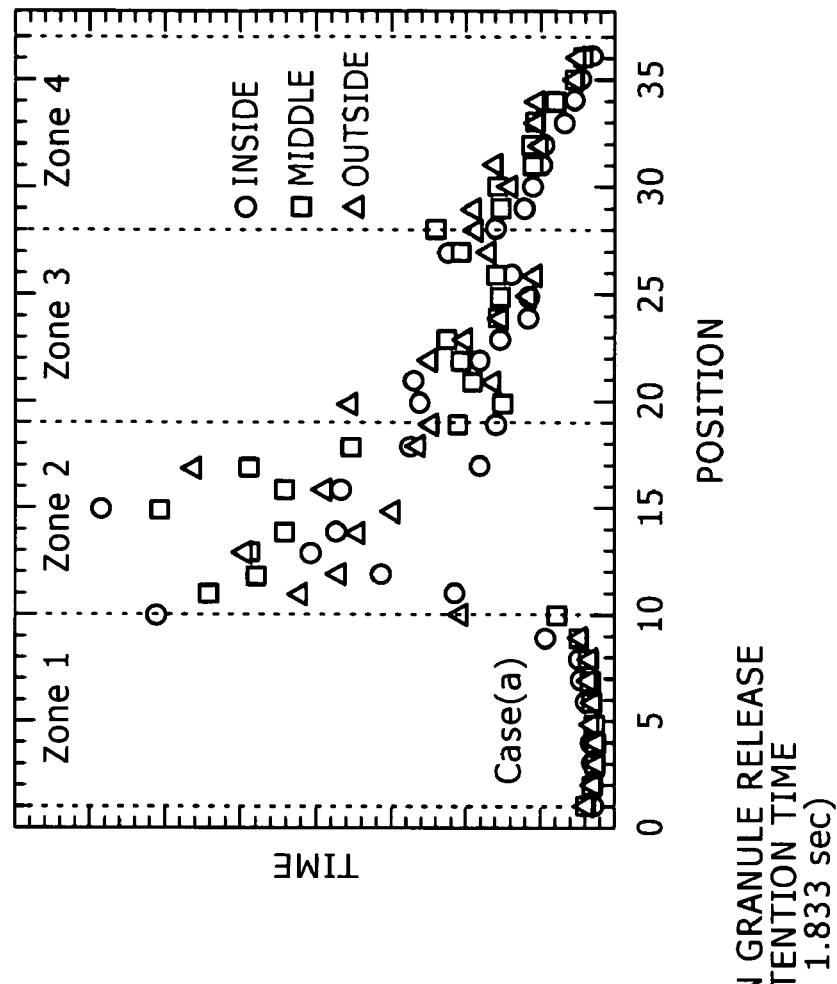
FIG. 7 comprises a trace diagram and a retention time distribution diagram of simulative granules in the interior of the water chamber obtained by simulation (the conventional water chamber)
Figure 7A:
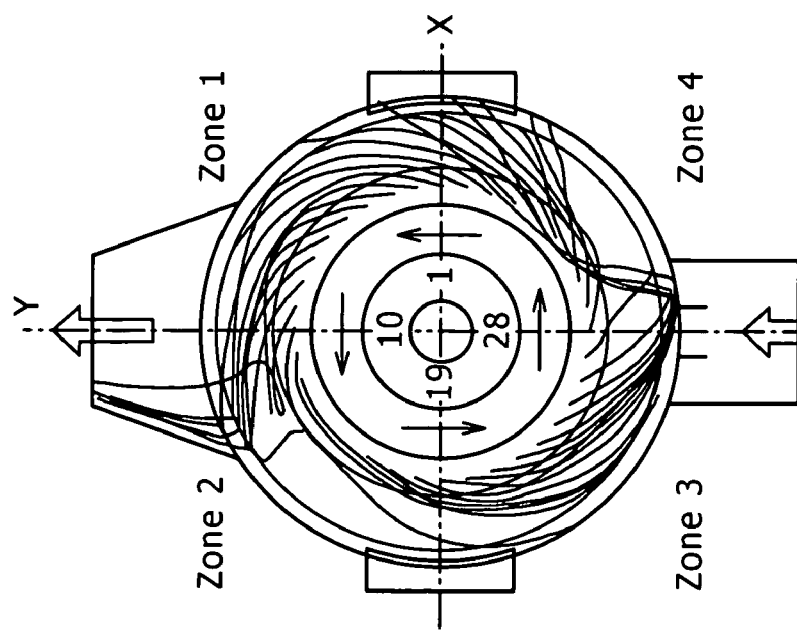

In FIG. 7(b), release positions of simulative granules are plotted along the axis of abscissa. As to release positions, as shown in FIG. 7(a) and FIG. 2, X-Y coordinates with the center of the water chamber 8 as the origin are considered and "position 1" is provided on the positive side of X axis, then positions up to "position 36" are set in increments of 10° in the positive rotational direction from position 1. Simulative granules are released from the places of "position 1 to position 36." It is assumed that in X-Y coordinates the first quadrant (position 1 to position 10) is Zone 1, the second quadrant (position 10 to position 19) is Zone 2, the third quadrant (position 19 to position 28) is Zone 3, and the fourth quadrant (position 28 to position 36) is Zone 4. Retention time of simulative granules (in the following description this may be simply called retention time) is plotted along the axis or ordinate.

As is apparent from FIG. 7(b), in Zone 2 which is positioned on the left side of the outlet portion 17, the retention time of simulative particles, which is 2 to 7 seconds, is longer than in the other zones and is very long in comparison with an average retention time (=1.833 sec) in all the zones. That is, it can be said that the simulative granules released from this zone is apt to stay within the water chamber 8. This phenomenon is presumed to occur for the following reason. In Zone 2, a flow occurs in a direction away from the outlet portion 17 with rotation of the cutters 5 and there also occurs a flow from the inlet portion 16 to the outlet portion 17, so that complicated flows induced by those flows are formed, resulting in stagnation of the flows.

Likewise, a look at traces (flowing traces) of simulative particles shown in FIG. 7(a) shows that the simulative granules released from Zone 2 once move in the rotating direction of the cutters 5 and then are forced back toward the outlet portion 17 while being carried on the flow advancing from the inlet portion 16 toward the outlet portion 17. As a result, the retention time of simulative granules in the interior of the water chamber 8 becomes long.

On the basis of these points the present inventors have revealed that in order to shorten the average retention time of simulative granules (pellets 10) in the interior of the water chamber 8 it is important to shorten the retention time of simulative granules in Zone 2.

[Fluid Simulation in the Water Chamber According to the Present Invention]

A study will now be made about the shape of the water chamber 8 which shape eliminates stagnation of the flow of cooling water in the interior of the water chamber 8 centered on Zone 2 and permits the pellets 10 to be discharged smoothly.

In view of the flow distribution and retention time distribution of simulative granules in the interior of the existing water chamber 8 the present inventors have reached the thinking that the following five points are effective in shortening the retention time of simulative granules.

(1) Enlarging the Inlet Portion 16

The flow velocity of cooling water entering the water chamber 8 is to be made uniform to prevent stagnation sideways of the water chamber 8.

(2) Tilting the Inlet Portion 16 Relative to the Die Plate 3

A flow velocity component in a direction perpendicular to the die plate 3 is to be created to make it easier for the simulative granules 3 to leave the die plate 3.

(3) Making the Height of the Inlet Portion 16 Small

The flow velocity near the die plate 3 is to be increased to make it easier for the simulative granules 3 to leave the die plate 3.

(4) Enlarging the Outlet Portion 17

The cooling water inflow side 20 of the outlet portion 17 is to be enlarged to make it easier for the simulative granules to be discharged from the outlet portion 17. Consequently, the outlet portion 17 is in an inverted divergent shape.

(5) Making the Outlet Portion 17 Asymmetric With Respect to the Diametrical Direction of the Water Chamber 8

Since the opening of the portion which provides communication between Zone 2 and the outlet portion 17 becomes large, the simulative granules present in Zone 2 become easier to be discharged from the outlet portion 17.

Water chambers 8 of the shapes of Case (b) to Case (g) shown in FIG. 8 were set on the basis of the above presumptions and the calculation of flow was conducted with respect each of the water chambers. In connection with conditions shown in FIG. 8, "Divergent inlet" means that the inlet portion 16 has a divergent shape, and "Slant inlet" means that the inlet portion 16 is formed in the water chamber 8 inclinedly in side view so as to face the die plate 3 installed within the water chamber 8. "Parallel velocity" means that the flowing direction of cooling water introduced into the inlet portion 16 is substantially parallel to the die plate 3 and "Slant velocity" means that the flowing direction of cooling water introduced into the inlet portion 16 faces toward the die plate 3. "Divergent outlet" means that the sectional area on the cooling water inflow side 20 of the outlet portion 17 is increased and that the shape of the outlet portion 17 is made an inverted shape. "Asymmetric outlet" means that the shape of the outlet portion 17 in plan view is asymmetric with respect to the diametrical direction of the water chamber 8.

Water chambers 8 according to several conditions do not have the windows 18 and have concave/convex-free inner walls (Case (a)', Case (d)', Case (f)', Case (g)').

In FIG. 9 there are shown simulation results on seven shapes of water chambers 8.

Reference to the simulation results show that the retention times of simulative particles of Case (d) and Case (f) are shorter than in the other conditions. Also in the water chambers 8 of Case (d)' and Case (f)', that is, in water chambers 8 of the conditions Case (d) and Case (f) not having the windows 18, the retention times of simulative granules are shorter than in the other conditions.

Figure 10:
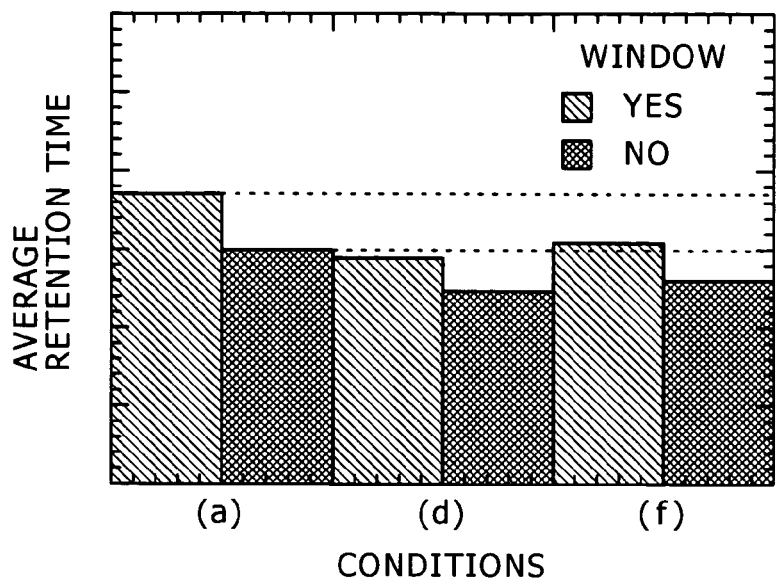
FIG. 10 illustrates a relation between the presence or absence of a window portion of a water chamber and an average retention time of simulative granules.

In FIG. 10 there are shown simulation results of average retention times of simulative granules with respect to water chambers 8 which are different in only the point of whether the windows 18 are present or not.

From FIG. 10 it is seen that in all of Case (a), (d) and (f) the average retention time becomes shorter by omitting the windows 18. However, the difference is a minor difference.

When considering the above results synthetically, it can be said that for a detailed investigation of whether the foregoing presumed conditions (1) to (5) are correct or not, it is useful to deepen the study about the water chambers of Case (d)' and Case (f)' which are short in the retention time of simulative granules. The reason is that as to the water chambers 8 long in retention time, their shapes are not adopted.

In this connection, a detailed study will now be made about the calculation results on Case (d)' and Case (f)'. A related comparative example is Case (a)'. The reason why calculation was made using the water chambers 8 free of windows 18 is that it is intended to lighten the burden on the computer used in simulation. In the water chamber 8 of Case (d)' the inlet portion 16 is in a divergent shape having an inclination of α and the velocity is slant. In the water chamber 8 of Case (f)' the inlet portion 16 is in a divergent shape, while the outlet portion 17 is in an inverted divergent shape and is asymmetric.

Figure 11:
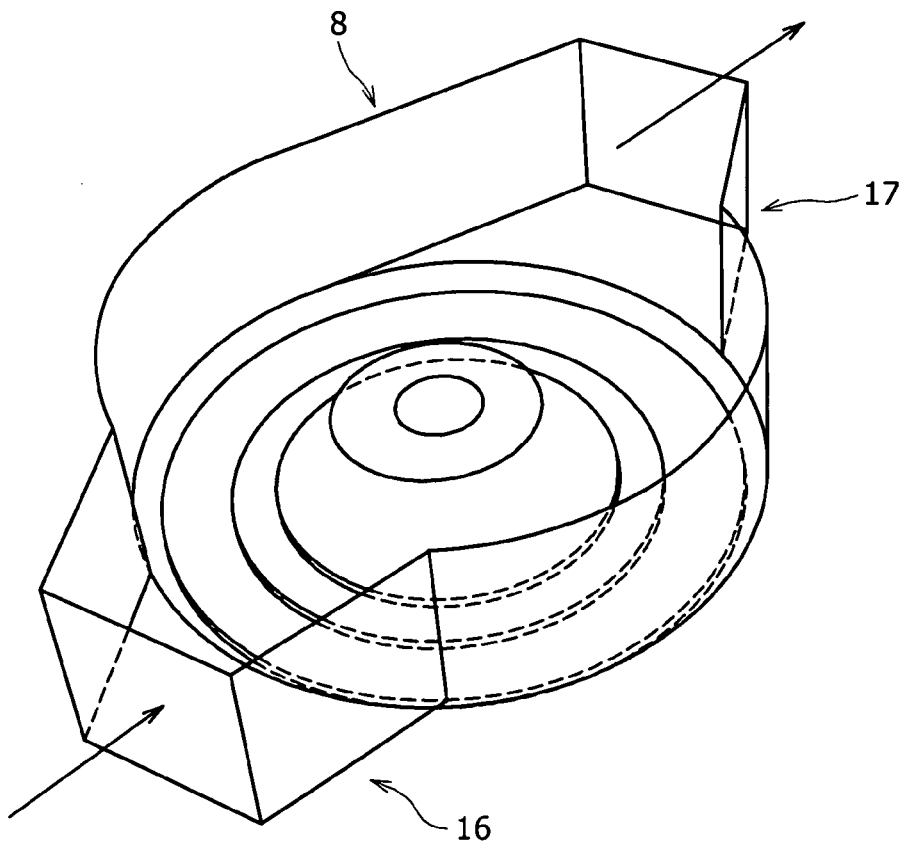
FIG. 11 illustrates the shape of a water chamber of Case (f)'.

In FIG. 11, the water chamber 8 which satisfies the condition of Case (f)' is shown in terms of a wire frame.

Figures 12A, 12B:
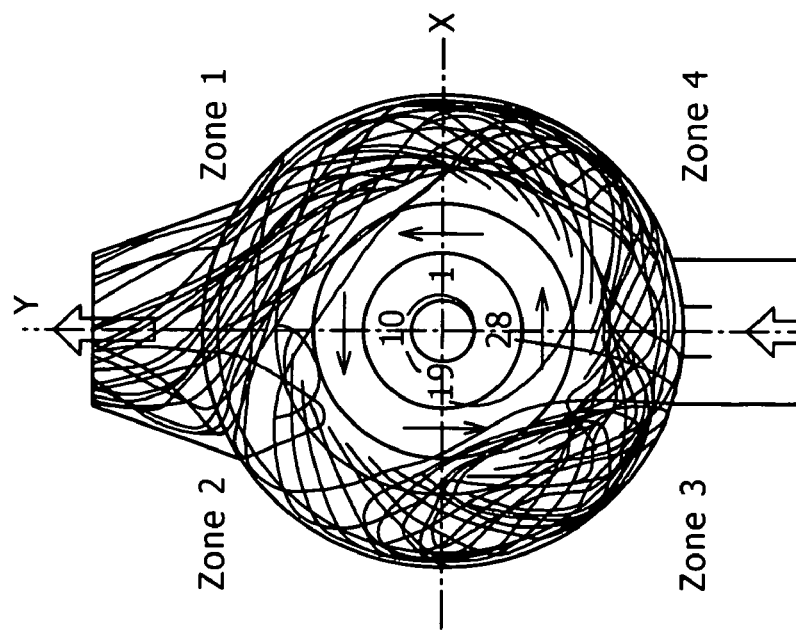
FIG. 12 comprises a flowing trace diagram and a retention time distribution diagram of simulative granules (water chamber of Case (a)')
Figure 13B:
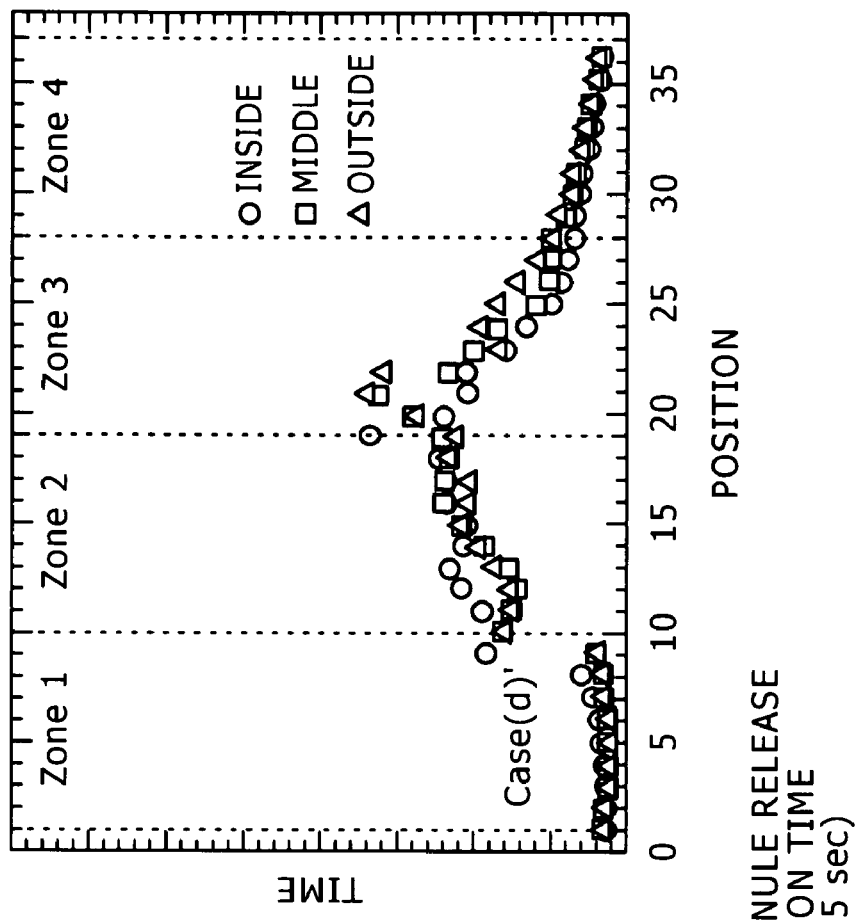
FIG. 13 comprises a flowing trace diagram and a retention time distribution diagram of simulative granules (water chamber of Case (d)')
Figure 13A:
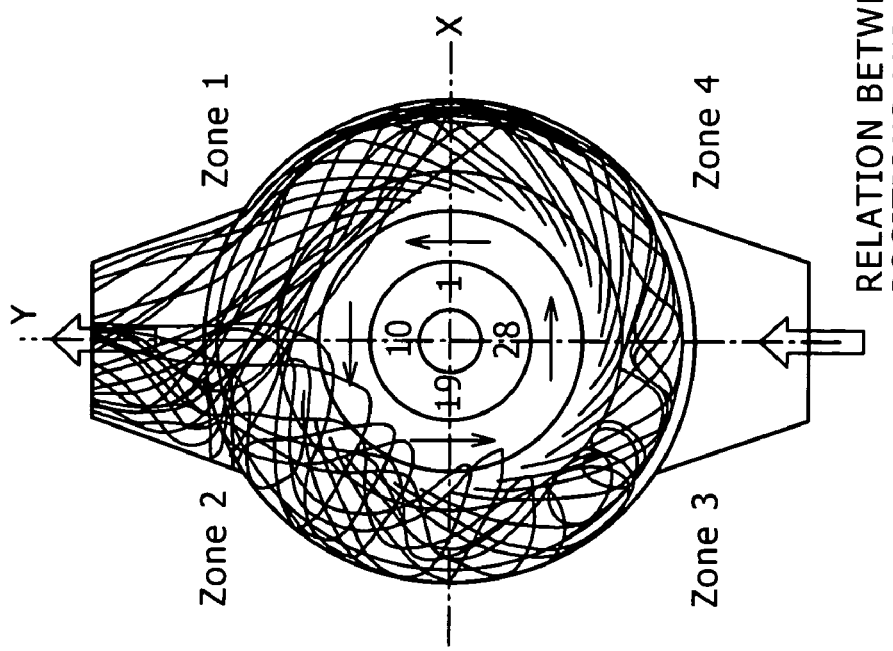
Figure 14B:
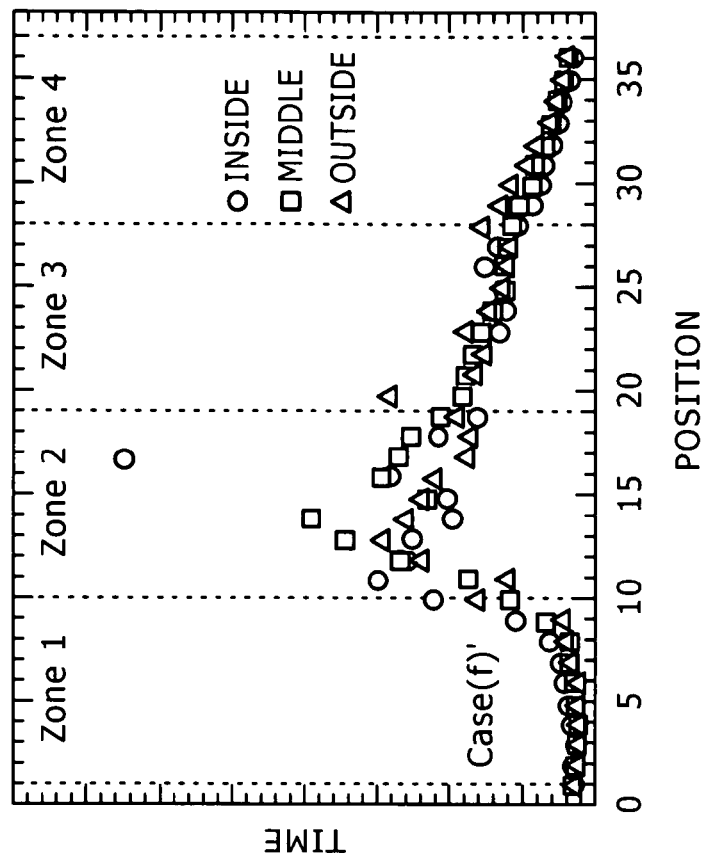
FIG. 14 comprises a flowing trace diagram and a retention time distribution diagram of simulative granules (water chamber of Case (f)')
Figure 14A:
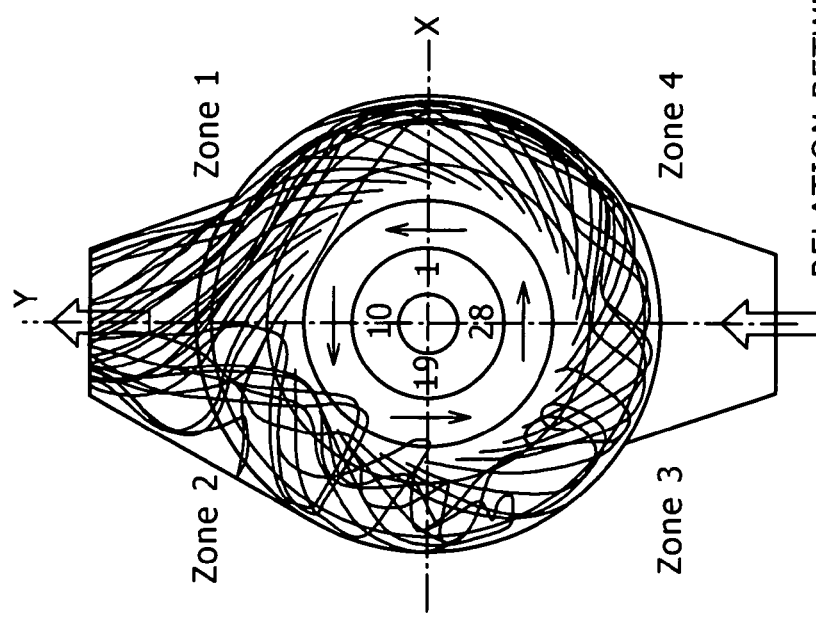

In FIGS. 12 to 14 there are shown flow velocity distributions and simulative granule retention times in Case (a)', Case (d)' and Case (f)'. From the same figures it is seen that in the water chambers 8 of Case (d)' and Case (f)', in comparison with the comparative example of Case (a)', the average retention time is decreased about 0.1 sec or more and the simulative granule retention time in Zone 2 is short.

Further, as is apparent from the flowing traces of simulative granules shown in FIG. 15, in Case (a)', the flowing traces of simulative granules describe a circle and stagnate sideways of the inlet portion 16, while such stagnation is not recognized in the water chambers 8 of Case (d)' and Case (f)'. As a result, the retention time in Zone 2 is short.

Judging from the above results, it is preferable that the shape of the water chamber 8 which does not permit a long-time retention of pellets 10 cut by the cutters 5 be a shape satisfying the conditions of Case (d), Case (f), or the conditions of Case (d)', Case (f)'. In other words, by forming the inlet portion in a divergent shape, or tilting the inlet portion 16 at an angle of α, or by forming the outlet portion 17 in an inverted divergent shape, the retention time of pellets 10 in the interior of the water chamber 8 can be made uniform and short, further, variations in temperature of the pellets 10 can be kept to a minimum and the contact of the pellets with the inner surface of the water chamber 8 and the cutters 5 can be prevented.

Having made a further simulation, the present inventors found out that the retention of pellets 10 is minimum when the following conditions are satisfied.

The shape of the inlet portion 16 of the water chamber 8 satisfies the following relationship:

$$(IL2 \cdot d)/(IL1 \cdot d) = 1.5 \sim 3.0 \tag{1}$$

The inclination of the inlet portion 16 satisfies the following relationship:

$$\alpha = 5° \sim 45° \tag{2}$$

The shape of the outlet portion 17 of the water chamber 8 satisfies the following relationship:

$$(OL2 \cdot d)/(OL1 \cdot d) = 1.5 \sim 3.0 \tag{3}$$

$$OL22/OL21 = 0.535/0.869 = \text{approximately } \tfrac{2}{3} \tag{4}$$

In the above equations, IL1 represents the width on the cooling water inflow side of the inlet portion 16, IL2 represents the width on the cooling water outflow side of the inlet portion 16 (the width on the water chamber 8 side of the inlet portion 16), and IL3 represents the distance between the cooling water inflow side 20 and the cooling water outflow side 21.

OL1 represents the width on the cooling water outflow side 21 of the outlet portion 17, OL2 represents the width on the cooling water inflow side 20 of the outlet portion 17 and OL2=OL21+OL22. OL3 represents the distance between the cooling water inflow side 20 and the cooling water outflow side 21.

The distance between the upper wall 12 and the lower wall 9 of the water chamber 8 is d, the distance between the upper wall 12A and the lower wall 9A of the inlet portion 16 is also d, and the distance between the upper wall 12B and the lower wall 9B of the outlet portion 17 is also d.

Further, α represents the angle between an extension line of the die plate 3 and the center line of the inlet portion 16.

By satisfying the above relationships (1) to (4) it becomes possible to make uniform and short the retention time of the pellets 10 in the interior of the water chamber 8.

It is preferable that the sectional area (IL1·d) on the cooling water inflow side 20 of the inlet portion 16 and the sectional area (OL1·d) on the cooling water outflow side 21 of the outlet portion 17 be almost equal to each other.

[Relation to Granule Diameter and Flow Rate]

Since the above simulation is performed under the conditions of simulative granule diameter=2.4 mm and cooling water flow rate=700 m³/h, no consideration is given to the resulting influence in the case where the simulative granule diameter or the flow rate of cooling water changes. In view of this point the present inventors have conducted a simulation while changing the simulative granule diameter or the flow rate of cooling water.

Figure 16:
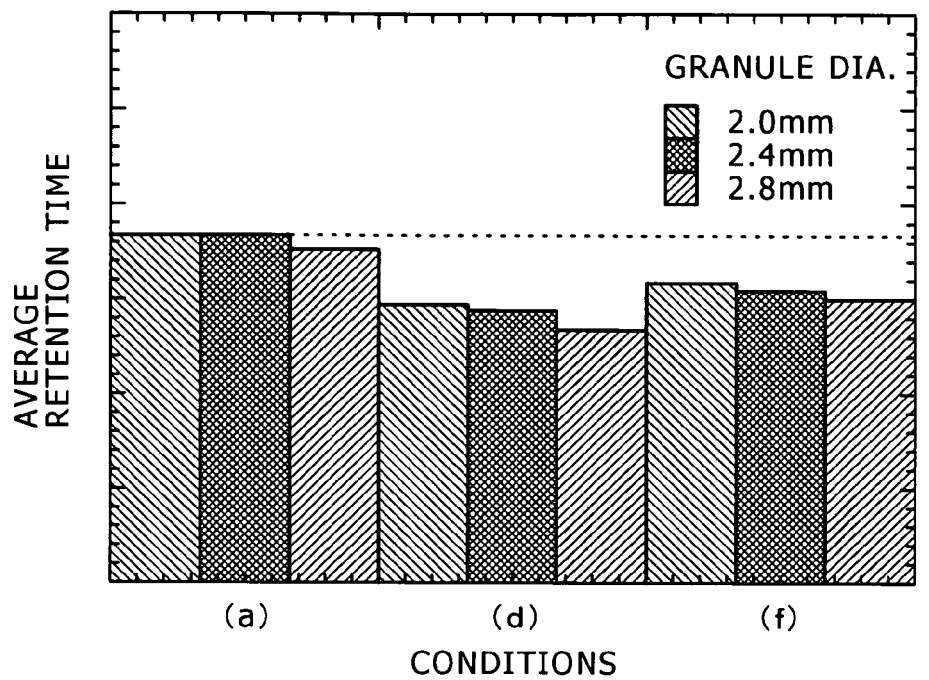
FIG. 16 illustrates a relation between the diameter and an average retention time of simulative granules.

FIG. 16 shows average retention times of simulative granules obtained when changing the diameter of cut pellets 10, i.e., the diameter of simulative granules, in the interior of the water chamber 8, like 2.0, 2.4, 2.8 mm. The conditions of Case (a), Case (d) and Case (f) were adopted in connection with the shape of the water chamber 8.

As is seen from the same figure, insofar as the shape of the water chamber 8 is the same, the average retention time is almost the same independently of the granule diameter. Conversely, even if the granule diameter changes, the retention time of simulative granules in the water chambers 8 of Case (d) and Case (f) is short in comparison with that in the conventional water chamber 8. Further, as the entire tendency, it can be seen that the larger the granule diameter, the shorter the average retention time. The reason is presumed to be that the larger the granule diameter, the more influential the buoyancy and the larger the number of granules gathering on the upper portion side of the water chamber 8 where the velocity of flow advancing toward the outlet side is high, resulting in an increase in the quantity of granules discharged and a decrease of the retention time.

Figure 17:
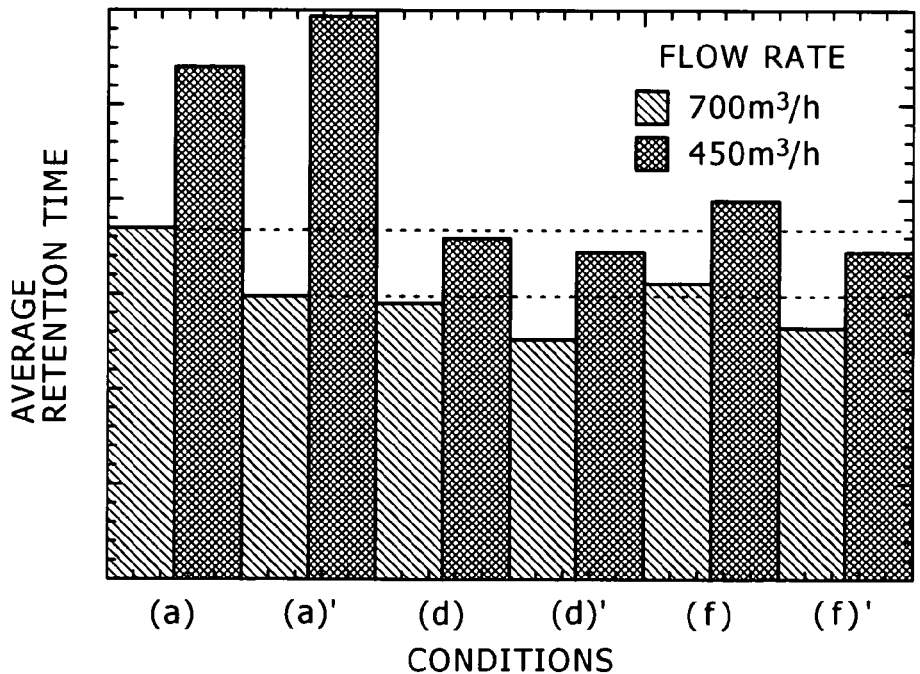
FIG. 17 illustrates a relation between the flow rate of cooling water and an average retention time of simulative granules.

In FIG. 17 there is shown the result of simulation performed under the two conditions of 700 m³/h and 400 m³/h with respect to the flow rate of cooling water. The conditions of Case (a), Case (d), case (f) and the conditions of Case (a)', Case (d)', Case (f)' were adopted in connection with the shape of the water chamber 8. The diameter of each simulative granule is set at 2.4 mm.

As is seen from the same figure, the smaller the flow rate of cooling water, the longer the retention time of simulative granules in all the shapes of water chambers 8.

The reason is presumed to be that as the amount of water supplied from the inlet portion 16 becomes small, a rotating flow induced with rotation of the cutters 5 becomes more influential and the simulative granules are apt to stay within the water chambers 8. However, in the shapes (Case (d), Case (f), Case (d)', Case (f)') of water chambers 8 according to the present invention, even if the flow rate of cooling water changes, the average retention time does not change so greatly and is ≦2 sec.

Even when the amount of cooling water is as small as 400 m³/h, an average retention time in the water chamber 8 of Case (f)' is 1.7 sec which is the shortest. Conversely, in the water chamber 8 of Case (a)', an average retention time is 3 sec and thus the retention of pellets 10 poses a problem.

[Results of Simulation]

Having repeated experiments through simulation of the flow of cooling water in the water chamber 8, the present inventors found out that the shortening of the average retention time of simulative granules (pellets 10) could be done by changing the shape of the water chamber 8 appropriately.

The following four points were found to be effective in changing the shape of the water chamber 8:

(1) Enlarging the inlet portion 16 (divergent shape of the inlet portion;

(2) Making the inlet portion 16 oblique relative to the die plate 3;

(4) Enlarging the outlet portion 17 (inverted divergent shape of the outlet portion 17); and (5) Making the outlet portion 17 asymmetric with respect to the diametrical direction of the water chamber 8.

The present invention is not limited to the above embodiment.

What is claimed is:

1. An underwater cutting pelletizer wherein a die plate having nozzles through which molten material to be processed is extruded and a cutter for cutting the to-be-processed material extruded from the nozzles into granules are installed therein and a water chamber is provided for flowing of cooling water therein to cool the cut granules and transfer the granules to an exterior,
   wherein the water chamber is in a circular shape and has an inlet portion on one side in a diametrical direction thereof to introduce cooling water into the water chamber and an outlet portion on the other side in the diametrical direction to discharge the cooling water from an interior of the water chamber to the exterior,
   a first cross section of the inlet portion increases continuously in an inflow direction of the cooling water, the first cross section being parallel to a circular surface of the water chamber, and
   a width of a second cross section of the inlet portion is substantially constant along the inflow direction, the second cross section being orthogonal to the circular surface of the water chamber.

2. The underwater cutting pelletizer according to claim 1, wherein a ratio (B/A) between a sectional area (A) on a cooling water inflow side and a sectional area (B) on a cooling water outflow side, in the inlet portion, is in a range of 1.5 to 3.0.

3. An underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior,
   the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior,
   the inlet portion being formed in the water chamber inclinedly so that the cooling water flowing through the inlet portion faces the die plate side in the interior of the water chamber.

4. The underwater cutting pelletizer according to claim 3, wherein the angle (α) of inclination of the inlet portion is in the range of 5° to 45°.

5. An underwater cutting pelletizer wherein a die plate having nozzles through which molten material to be processed is extruded and a cutter for cutting the to-be-processed material extruded from the nozzles into granules are installed therein and a water chamber is provided for flowing of cooling water therein to cool the cut granules and transfer the granules to the exterior,
   wherein the water chamber is in a circular shape and has an inlet portion on one side in a diametrical direction thereof to introduce cooling water into the water chamber and an outlet portion on the other side in the diametrical direction to discharge the cooling water from an interior of the water chamber to the exterior, and
   a cross section of the outlet portion increases continuously in a direction opposite to an outflow direction of the cooling water and is asymmetric with respect to the diametrical direction of the water chamber.

6. The underwater cutting pelletizer according to claim 5, wherein a ratio (C/D) between a sectional area (C) on a cooling water inflow side and a sectional area (D) on a cooling water outflow side, in the outlet portion, is in a range of 1.5 to 3.0.

7. An underwater cutting pelletizer wherein a die plate having nozzles through which molten material to be processed is extruded and a cutter for cutting the to-be-processed material extruded from the nozzles into granules are installed and a water chamber is provided for flowing of cooling water therein to cool the cut granules and transfer the granules to the exterior,
   the water chamber being in a circular shape and having an inlet portion on one side in a diametrical direction thereof to introduce cooling water into the water chamber and further having an outlet portion on the other side in the diametrical direction to discharge the cooling water from the interior of the water chamber to the exterior,
   the inlet portion being in a divergent shape in an inflow direction of the cooling water and being formed in the water chamber inclinedly so that the cooling water flowing through the inlet portion faces the die plate side in the interior of the water chamber, and
   the outlet portion being in a divergent shape in a direction opposite to an outflow direction of the cooling water and being asymmetric with respect to the diametrical direction of the water chamber.

* * * * *